US010208159B2

(12) United States Patent
Fukaya et al.

(10) Patent No.: US 10,208,159 B2
(45) Date of Patent: Feb. 19, 2019

(54) FLEXIBLE WIRING BOARD AND USE THEREOF

(71) Applicant: NORITAKE CO., LIMITED, Nagoya-shi, Aichi (JP)

(72) Inventors: Shuhei Fukaya, Obu (JP); Hirohito Kakizoe, Ichinomiya (JP); Tatsuya Baba, Nagoya (JP); Terusada Sugiura, Toyota (JP); Yasushi Yoshino, Nagoya (JP)

(73) Assignee: NORITAKE CO., LIMITED, Aichi (JP)

( * ) Notice: Subject to any disclaimer, the term of this patent is extended or adjusted under 35 U.S.C. 154(b) by 196 days.

(21) Appl. No.: 15/077,203

(22) Filed: Mar. 22, 2016

(65) Prior Publication Data

US 2016/0295686 A1 Oct. 6, 2016

(30) Foreign Application Priority Data

Mar. 30, 2015 (JP) ................. 2015-068366

(51) Int. Cl.
*C08G 59/24* (2006.01)
*C08G 59/36* (2006.01)
*C08G 59/38* (2006.01)
*C08L 63/00* (2006.01)
*C08K 3/08* (2006.01)

(52) U.S. Cl.
CPC ............ *C08G 59/24* (2013.01); *C08G 59/36* (2013.01); *C08G 59/38* (2013.01); *C08L 63/00* (2013.01); *C08K 2003/0806* (2013.01)

(58) Field of Classification Search
CPC ...................................... C08G 59/24
See application file for complete search history.

(56) References Cited

U.S. PATENT DOCUMENTS

| | | | |
|---|---|---|---|
| 2003/0008156 A1* | 1/2003 | Pocius | C09D 5/4434 428/457 |
| 2008/0096044 A1* | 4/2008 | Matsumoto | C03C 17/10 428/623 |

(Continued)

FOREIGN PATENT DOCUMENTS

| JP | 2002-094201 A | 3/2002 |
|---|---|---|
| JP | 2002/212492 A | 7/2002 |

(Continued)

OTHER PUBLICATIONS

Oct. 19, 2017 Office Action issued in Japanese Patent Application No. 2016-052319.

(Continued)

*Primary Examiner* — Megan McCulley
(74) *Attorney, Agent, or Firm* — Oliff PLC

(57) ABSTRACT

Provided is a flexible wiring board having high durability. The present invention provides a flexible wiring board including a flexible substrate and a conductive film formed on the flexible substrate. The conductive film contains a conductive powder and a curd product of a heat curable resin. The conductive film has pencil hardness of at least 2H, based on a pencil scratch hardness test in accordance with JIS K5600 5-4 (1999). The conductive film has adhesiveness of at least 95/100 by a 100 squares cross-cut test in accordance with JIS K5400 (1990).

17 Claims, 3 Drawing Sheets

(56) References Cited

U.S. PATENT DOCUMENTS

| | | | |
|---|---|---|---|
| 2009/0218127 A1* | 9/2009 | Fujita | C25D 5/56 174/389 |
| 2016/0014896 A1* | 1/2016 | Mansky | G02F 1/13439 174/258 |
| 2016/0118155 A1 | 4/2016 | Kobayashi | |
| 2016/0200927 A1* | 7/2016 | Wu | C09D 11/101 347/20 |

FOREIGN PATENT DOCUMENTS

| | | |
|---|---|---|
| JP | 2004-355933 A | 12/2004 |
| JP | 2012-246433 A | 12/2012 |
| JP | 2014-002992 A | 1/2014 |
| JP | 2014-107533 A | 6/2014 |
| JP | 2014-225709 A | 12/2014 |
| WO | 2014/013899 A1 | 1/2014 |
| WO | 2014/208445 A1 | 12/2014 |

OTHER PUBLICATIONS

May 31, 2018 Office Action issued in Japanese Application No. 2016-052319.

\* cited by examiner

[FIG. 1]
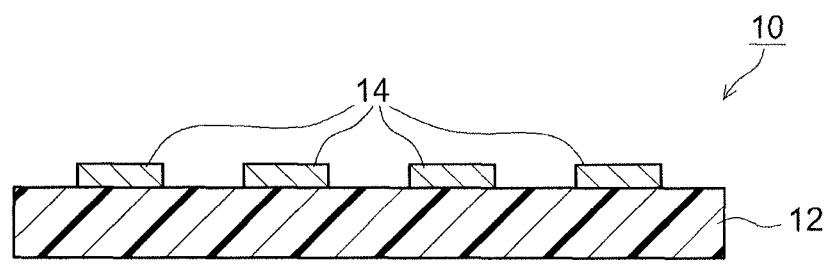

[FIG. 2]
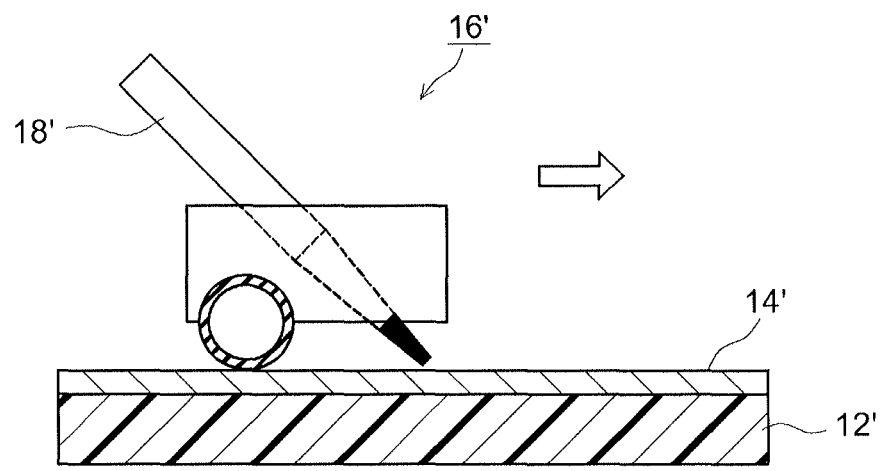

[FIG. 3]
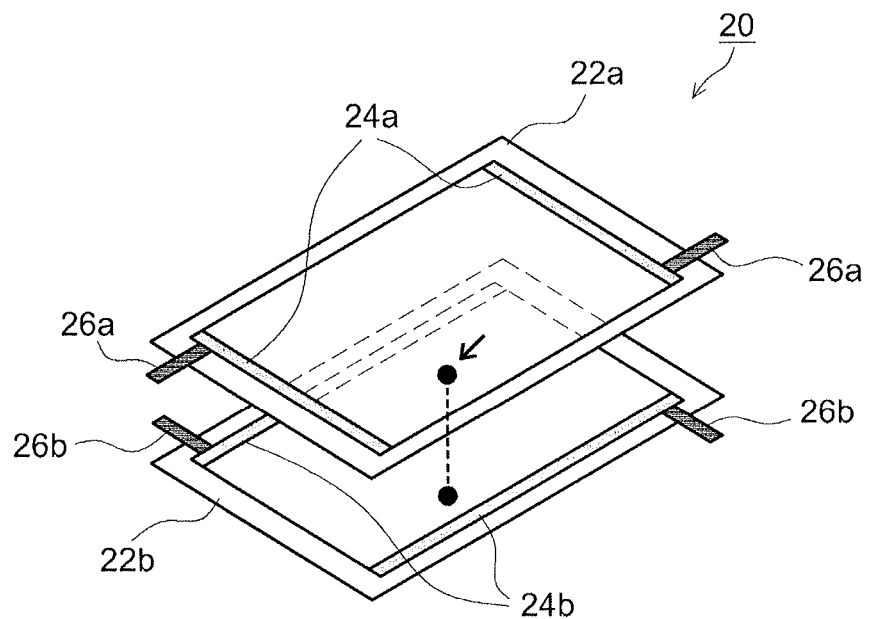
[FIG. 4]
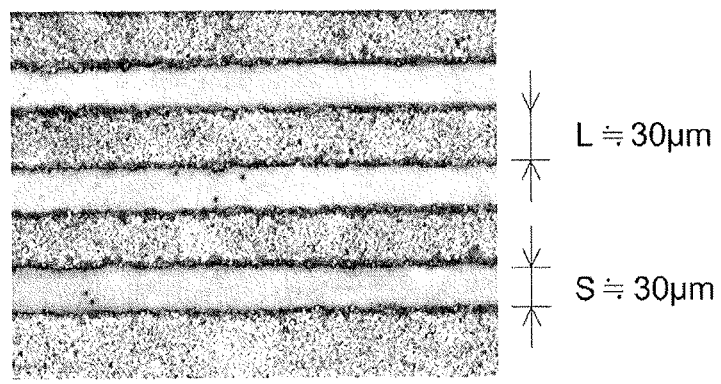

FLEXIBLE WIRING BOARD AND USE THEREOF

BACKGROUND OF THE INVENTION

1. Field of the Invention

The present invention relates to a flexible wiring board and use thereof. This application claims priority from Japanese Patent Application No. 2015-068366 filed on Mar. 30, 2015, the entire contents of which are incorporated herein by reference.

2. Description of the Related Art

In formation of an electrode wiring of electronic equipment parts and the like, a conductive paste is widely used. WO 2014/013899 and Japanese Patent Application Publication Nos. 2014-225709, 2014-2992, 2014-107533 and 2012-246433 disclose conductive pastes that could be used for the formation.

In recent years, in various electronic equipment and electronics, a flexible wiring board in which an electrode wiring (conductive film) is provided on a flexible substrate is heavily used in accordance with the downsizing, the reduction in weight, the reduction in thickness, and the increase in function. The flexible wiring board is required to have flexibility and bendability to comply with various movements of the electronic equipment and the like. For example, claims of WO 2014/013899 and the like disclose a touch panel including a conductive paste containing a binder resin composed of a thermoplastic resin, a metal powder, and an organic solvent or a wiring part obtained by imparting the conductive paste.

SUMMARY OF INVENTION

As described in WO 2014/013899, in the flexible wiring board, a thermoplastic resin as an adhesive component is generally used. This is intended to enhance the adhesiveness (adhesion) of the flexible substrate and the electrode wiring by using a resin having a skeleton that has high flexibility (is soft). However, the electrode using a thermoplastic resin is "soft", and thus, the heat resistance, the chemical resistance, and the film hardness (mechanical strength) are prone to be reduced, and the durability lacks.

Specifically, for example, when the electronic equipment is exposed to a high temperature and an organic solvent at the time of production and assembly, the electrode wiring is deformed and deteriorated, and a yield is reduced in some cases. When an impact or a load is given at the time of using the product, defects such as failures and disconnections of the electrode wiring are generated in some cases. Such tendencies become serious as the thickness of the electrode wiring is reduced. Moreover, in recent years, the use of the flexible wiring board has been spread, and the flexible wiring board has been exposed to harsh environments in many cases.

Therefore, the electrode wiring on the flexible wiring board is required to enhance the film hardness and improve durability characteristics.

Hence, the inventors of the present invention firstly tried to form a conductive film using a general heat curable resin. However, the flexibility of the heat curable resin was low because of the rigid chemical structure. Thus, the conductive film was difficult to be deformed to comply with the movement (deformation) of the flexible substrate, and there was a defect in reduction of the adhesiveness with the substrate. That is, it was difficult to form an electrode wiring (conductive film) having high durability, achieving both of the improvement in adhesiveness with the flexible substrate and the improvement in hardness.

The present invention was made in consideration of the point, and the present invention is intended to provide a flexible wiring board having high durability, achieving both of the superior adhesiveness (unity) of the flexible substrate and the conductive film and the high hardness of the conductive film.

According to the present invention, a flexible wiring board including a flexible substrate and a conductive film formed on the flexible substrate is provided. The conductive film contains a conductive powder and a cured product of a heat curable resin. This conductive film has following characteristics: (1) pencil hardness of at least 2H, based on a pencil scratch hardness test in accordance with JIS K5600 5-4 (1999); and (2) adhesiveness of at least 95/100 by a 100 squares cross-cut test in accordance with JIS K5400 (1990).

When the conductive film has the characteristic (1) pencil hardness of at least 2H, the conductive film superior in heat resistance, chemical resistance, and mechanical durability can be achieved. When the conductive film also has the characteristic (2) adhesiveness of at least 95/100 by a 100 squares cross-cut test, a favorable adhesion and adhesiveness with the flexible substrate can be achieved. Thus, according to the configuration, the durability characteristics of the conductive film can be improved while maintaining the adhesiveness of the flexible substrate and the conductive film. Therefore, a flexible wiring board having improved durability and reliability can be achieved.

In a preferable embodiment disclosed herein, the conductive film has adhesiveness of at least 99/100 by the 100 squares cross-cut test. Specifically, the conductive film has adhesiveness of 100/100 by the 100 squares cross-cut test. According to the configuration, the adhesiveness of the conductive film and the flexible substrate is further improved, and defects such as failures and disconnections derived from lack of durability of the conductive film can be highly enhanced. Therefore, the effects of the invention of the present application can be exerted at a high level.

In the preferable embodiment disclosed herein, a volume resistivity (heat-drying conditions: 130° C., 30 minutes) of the conductive film is 100 μΩ·cm or less. According to the configuration, the conductive film not only having high durability but also being superior in electric conductivity can be achieved.

In the preferable embodiment disclosed herein, the heat curable resin contains (a) an epoxy resin, as a first heat curable resin. In the preferable embodiment, the epoxy resin contains (a1) a polyfunctional epoxy resin having two or more epoxy groups, (a2) a monofunctional epoxy resin having one epoxy group, and (a3) a flexible epoxy resin having a structure of three of more consecutive secondary carbons.

In a further preferable embodiment, the thermosetting resin further contains (b) an epoxy-containing acrylic resin having one or more epoxy groups, as a second heat curable resin.

According to the configuration, at least one effect of an improvement in adhesiveness with the flexible substrate, an improvement in heat resistance, an improvement in chemical resistance, and an improvement in film hardness, and an improvement in durability is exerted. Therefore, the effects of the invention of the present application can be exerted at a high level.

In the preferable embodiment disclosed herein, an average aspect ratio of the conductive powder is 1.0 to 1.5.

In another preferable embodiment disclosed herein, an average particle diameter of the conductive powder based on the laser diffraction-light scattering method is 0.5 to 3 μm.

In another preferable embodiment disclosed herein, the conductive powder contains no squamous conductive particles.

When the conductive powder satisfies at least one of the properties, workability (for example, a handling ability of paste, laser processability of conductive film) at the time of forming a conductive film can be improved. Therefore, a thin electrode wiring can be stably formed.

The flexible wiring board disclosed herein is superior in durability characteristic and reliability. Therefore, the flexible wiring board can be particularly preferably used in portable electronic equipment to which an impact or a load is given by dropping. In other words, the technology disclosed herein provides a flexible wiring board preferably used in a portable electronic equipment.

BRIEF DESCRIPTION OF THE DRAWINGS

FIG. 1 is a schematic cross-sectional view showing a flexible wiring board according to an embodiment;

FIG. 2 is a schematic cross-sectional view explaining the pencil scratch hardness test;

FIG. 3 is a schematic perspective view showing a flexible wiring board for touch panel, according to an embodiment; and FIG. 4 is a laser microscope image of a conductive film according to Example 1.

DESCRIPTION OF THE PREFERRED EMBODIMENTS

Preferable embodiments of the present invention are described below with reference to the drawings as appropriate. Matters necessary to practice this invention (e.g., general preparation method for the conductive paste, the general formation method of the conductive paste, etc.) other than those specifically referred to in this description (e.g., the properties and the composition of the conductive film in the wiring board) may be understood as design matters to a person ordinarily skilled in the art based on the conventional art in the pertinent field. The present invention can be praticed based on the contents disclosed in the description and common technical knowledge in the subject field. In the following drawings, the members and parts that exert the same action are denoted by identical reference numerals, and the overlapping description may be omitted or simplified. The embodiments described in the drawings are illustrated for clearly describing the present invention, and the dimensional relationship (the length, the width, the thickness, and the like) does not accurately show actual dimensions.

In the description, "A to B (A and B are optional values)" encompasses values of A and B (the upper limit and the lower limit) unless otherwise specifically noted.

<Configuration of Flexible Wiring Board>

FIG. 1 is a schematic cross-sectional view showing a flexible wiring board according to an embodiment of the present invention. The wiring board may encompass a circuit board, a printed board, and the like. The flexible wiring board 10 shown in FIG. 1 includes a flexible substrate 12 and a conductive film 14 formed on the flexible substrate 12 (e.g., the surface of the flexible substrate 12). The conductive film 14 is formed in a prescribed pattern according to a design drawing determined in advance. In this embodiment, a plurality of conductive films 14 are individually formed on a surface of the flexible substrate 12 at prescribed intervals.

The conductive film 14 may be, as shown in FIG. 1, provided on only one surface of the flexible substrate 12 or may be provided on both surfaces of the flexible substrate 12. As shown in FIG. 1, the number of the conductive films 14 may be plural or one. The conductive film 14 may be provided on a part or the entire surface of the flexible substrate 12.

<Formation of Flexible Wiring Board>

Such a wiring board can be produced as follows, for example. A paste for forming a conductive film is prepared by weighing out the materials for forming a conductive film, such as a conductive powder, a heat curable resin, a curing agent, and the like to a prescribed ratio (mass ratio) and uniformly mixing these. The materials can be mixed with various conventional mixing devices such as a roll mill, a magnetic stirrer, a planetary mixer, a disperser, and the like.

Subsequently, the paste is applied (spread) to the flexible substrate to a desired thickness. The paste can be applied, for example, by screen printing or with a bar coater, slit coater, gravure coater, dip coater, spray coater, or the like.

Subsequently, the paste applied on the flexible substrate is subjected to heat drying. From the viewpoint of resisting damage of the substrate and improving the productivity, the heat drying temperature may be set to be slightly lower than the heat resistance temperature of the flexible substrate, typically 200° C. or less, preferably 180° C. or less, more preferably 100° C. to 150° C., particularly preferably 100° C. to 130° C. The heat drying time may be typically 1 to 60 minutes, for example, 10 to 30 minutes. Thus, the heat curable resin in the paste is cured, and a conductor (conductive film) in a film form is formed.

In a preferable embodiment, to form the conductive film into a desired shape (e.g., thin line shape), the other part is irradiated with a laser beam. The type of the laser is not limited to particular lasers, and any of the lasers that are known to be used for this purpose can be used. Preferred examples of the laser include an IR laser, a fiber laser, a $CO_2$ laser, an excimer laser, a YAG laser, and a semiconductor laser. The light energy of the laser is converted into heat energy and reaches the conductive film. Accordingly, a part to be irradiated with a laser beam in the conductive film is thermally decomposed, melted, and removed. Then, the part not to be irradiated with a laser beam remains, and an electrode wiring is formed. According to the method, for example, a thin line electrode wiring that is difficult to be achieved by screen printing can be stably obtained.

Thus, a flexible wiring board including conductive film (electrode wiring) having a prescribed pattern on a flexible substrate can be obtained. The components of the flexible wiring board are described below.

<Flexible Substrate>

The flexible substrate is a soft material and has flexibility allowing elastic deforming as represented by bending and warping. In the description, the "flexible substrate" refers to a substrate that does not have cracks and fractures at the time when the substrate is warped along a cylindrical test member with a radius of curvature of 25 mm (a curvature 0.04/mm). The flexible substrate typically has insulation properties.

The material of the flexible substrate is not limited to particular materials, and any of various substrates that can be used in a general flexible wiring board can be used as appropriate. Specific examples of the material include: plastic substrates composed of resins such as polypropylene (PP), polyethylene terephthalate (PET), polyethylene naphthalate (PEN), polyether sulfone (PES), polysulfone (PSF), polycarbonate (PC), polyether imide (PEI), polyarylate (PAR), polybutylene terephthalate (PBT), polyether ether ketone (PEEK), nylon, vinyl, polyvinyl fluoride, vinyl chloride, polyamide, and acryl; an amorphous silicon substrate; a glass substrate; and a rubber substrate.

For example, for requirement of high heat resistance, a substrate formed of polyethylene terephthalate or polyethylene naphthalate is preferably used. For example, for the requirement of optical characteristic (transparency), a substrate formed of polycarbonate or acryl is preferably used.

Various additives such as a filler (an inorganic filler, an organic filler, etc.), a colorant (a pigment or a dye), anti-aging agent, an antioxidant, a UV absorber, an antistatic agent, a lubricant, and a plasticizer may be mixed in the flexible substrate (e.g., a plastic substrate) if necessary.

The thickness of the flexible substrate is not limited to particular thicknesses and can be selected, as appropriate, according to the purpose. From the viewpoint of imparting an appropriate strength to the flexible substrate, the thickness is approximately 10 µm or more, typically 50 µm or more, for example, 1 mm or more. From the viewpoint of exerting greater pliability or flexibility intrinsic to flexible substrates, the thickness is approximately 50 mm or less, for example, 10 mm or less.

An under layer such as, for example, a conductive layer, an insulating layer, an antireflection layer (optical adjustment layer) may be formed on a part or the entire surface of the flexible substrate. In this case, the conductive film disclosed herein may be formed on the surface of these underlayers.

Examples of the conductive layer include: thin layers (a thin film, a film), mesh-shaped (net-shaped) sheet (e.g., a metal mesh film) containing conductive substances such as metals such as gold, silver, chromium, copper, and tungsten; metal oxides such as tin oxide, zinc oxide, indium tin oxide (ITO), fluorine-doped tin oxide (FTO), and aluminum-doped zinc oxide (AZO); conductive carbon materials such as a silver nanowire, carbon nanotube (CNT), a carbon fiber, and black lead (graphite); an organic conductive substrate (typically, a conductive polymer) such as polyaniline, polypyrrole, polythiophene, polyethylenimine, and an allylamine-based polymer. The conductive layer can be particularly a transparent conductive film.

Examples of the insulating layer include thin films composed of $SiO_2$ and silicon alkoxide.

<Characteristics of Conductive Film>

The conductive film disclosed herein is characterized in having all of following characteristics:
(1) The pencil hardness of at least 2H based on a pencil scratch hardness test; and
(2) adhesiveness of at least 95/100 with respect to the flexible substrate by a 100 squares cross-cut test.

Accordingly, the conductive film can have "toughness" and "flexibility" that are contradictory characteristics. Therefore, the conducive film having both superior durability characteristics intrinsic to the heat curable resin and flexibility (favorable adhesiveness with the flexible substrate) that can comply with the movement of the flexible substrate can be achieved.

The conductive film disclosed herein fully exerts the characteristics of the heat curable resin (cured product) and has a higher film hardness and higher mechanical durability. The pencil hardness of the conductive film is at least 2H, more preferably at least 3H. The upper limit of the pencil hardness is not limited to particular pencil harnesses. This all being said, the characteristics (1) and (2) are generally in the contradictory relationship, and thus, from the viewpoint of having both of the characteristics at a high level, the upper limit is 5H or less, for example, 4H or less. The pencil hardness can be adjusted according to the kind and the mixing ratio of the heat curable resin to be used, for example.

The pencil hardness can be measured by the pencil scratch hardness test in accordance with JIS K5600 5-4 (1999).

FIG. 2 is a schematic cross-sectional view explaining the pencil scratch hardness test.

Specifically, a conductive film 14' to be measured is formed on a substrate 12' in advance.

Subsequently, a pencil scratch hardness tester 16' is prepared, which satisfies the following conditions defined in JIS: the main body has two wheels and is formed of a metal; the tip of the pencil is loaded with 750±10 g; the angle of the pencil is 45±1°; and a spirit level for determining a level is provided. As the tester, for example, a TQC ISO pencil scratch hardness tester (model: "VF-2378", available from COTEC Co., Ltd.) can be used. Moreover, a pencil 18' placed in the teste is provided. The tip of pencil lead is rubbed with a polishing paper to be flat, so as to have a cylindrical pencil lead. The pencil hardness (pencil concentration) is increased from 6B, 5B, 4B, 3B, 2B, B, F, H, 2H, 3H, 4H, 5H, and 6H in this order.

Subsequently, a pencil scratch hardness tester 16' is arranged on the surface of a conductive film 14', and the tester 16' is pushed at 0.5 to 1 mm/s. Then, a part of the surface of the conductive film 14', through which the tester 16' is passed, is observed by visual check, to check whether or not there is damage such as a scratch and the like in the conductive film 14'. When there is no damage in the conductive film 14', the hardness of the pencil 18' is increased, and this operation is then repeated.

Then, the highest hardness of pencil, at which damage is not generated in the conductive film 14' is determined as the "pencil hardness". The same method is employed in the worked examples described below.

For example, even when the flexible wiring board is folded and bent, the adhesiveness (unity) of the conductive film disclosed herein with the flexible substrate can be favorably maintained, and failures and disconnections of the electrode wiring can be highly suppressed. The conductive film has adhesiveness of at least 95/100 by the 100 squares cross-cut test. The adhesiveness is preferably adhesiveness of at least 98/100, more preferably adhesiveness of at least 99/100, particularly preferably adhesiveness of 100/100. For example, the adhesiveness can be adjusted according to the kind, the mixing ratio, and the like of the heat curable resin to be used.

The adhesiveness can be evaluated by the 100 squares cross-cut test in accordance with JIS K5400 (1990).

Specifically, the conductive film is formed on the surface of the flexible substrate in advance.

Subsequently, about 100 1-mm squares are formed in the conductive film by a box cutter or the like so as to be a grid. An adhesive cellophane tape is then adhered to all of the squares, and the adhesive cellophane tape is thereafter teared without stopping at an angle of 45°.

Then, the adhesiveness is evaluated by the number of squares adhering to the substrate, exhibiting no peeling. The same method applies to the worked examples described below.

In a preferable embodiment, the resistance of the conductive film disclosed herein is kept low. For example, the volume resistivity (heat-drying conditions: 130° C., 30 minutes) is 100 µΩ·cm or less. Accordingly, a favorable electric conductivity can be achieved. The lower the volume resistivity, the better, and the volume resistivity is preferably 80 µΩ·cm or less, more preferably 60 µΩ·cm or less, particularly preferably 50 µΩ·cm or less.

The thickness of the conductive film is not limited to particular thicknesses and can be selected as appropriate according to the purpose. From the viewpoint of achieving favorable electric characteristics by reducing the resistance, the thickness is about 0.1 µm or more, typically 0.5 µm or more, for example, 1 µm or more. From the viewpoint of downsizing, reducing the weight, and reducing the thickness, the thickness is about 50 µm or less, for example 10 µm or less.

<Configuration of Conductive Film>

The conductive film disclosed herein comprises, as essential components, a conductive powder and a cured product of a heat curable resin. The components and the like of the conductive film are described below.

<Conductive Powder>

The conductive powder is a component that imparts electric conductivity to a conductive film. The conductive powder is not limited to particular conductive powders, and any of various metals, alloys, and the like having desired conductivity and other physical properties can be employed as appropriate. Preferred examples of the conductive powder include metals metal such as gold (Au), silver (Ag), copper (Cu), platinum (Pt), palladium (Pd), ruthenium (Ru), rhodium (Rh), iridium (Ir), osmium (Os), nickel (Ni), and aluminium (Al), a mixture of these coatings, an alloy of these, and the like. Among them, a metal such as silver (Ag), platinum (Pt), or palladium (Pd) alone, a mixture of these (silver-coated copper or silver-coated nickel), or an alloy (silver-palladium (Ag—Pd), silver-platinum (Ag—Pt), or silver-copper (Ag—Cu)) is preferable. Silver, a silver-coated product, or an alloy of silver is particularly preferable because of the relatively low cost and the superior electric conductivity.

The shape of the conductive powder is not limited to particular shapes, and various shapes such as a spherical shape, a squamous shape (flake shape), and a needle shape can be considered. Among them, spherical or approximately spherical conductive particles are preferable. Accordingly, the handleability of the paste and the workability at the time of printing can be improved. Moreover, the laser processability of the conductive film is improved, and a thin line electrode wiring can be formed stably.

Generally, the contact area between particles of the conductive powder composed of spherical or approximately spherical conductive particles is smaller than that of the conductive powder composed of, for example, squamous conductive particles having a higher aspect ratio. Therefore, the increase in volume resistance is concerned, and in the formation of an electrode wiring that is required to have high electric conductivity, the use of the conductive particles is prone to be avoided. However, in the conductive film disclosed herein, the volume resistivity that is equivalent to that in the case of using conductive particles having a higher aspect ratio can be achieved because of the effect of optimizing the heat curable resin described below and the like.

In the description, "approximately spherical" is a term encompassing a spherical shape, a rugby ball shape, a polyhedral shape, and the like and for example, has an average aspect ratio (ratio of the major axis to the minor axis) of 1 to 2, typically 1 to 1.5, for example, 1.1 to 1.4.

In the description, the "average aspect ratio" refers to an average of plural ratios of the major axes to the minor axes of conductive particles. For example, at least 30 (e.g., 30 to 100) conductive particles are observed using an electron microscope. Then, the circumscribing minimum rectangle is drawn for each particle image and the ratio (A/B) of the length A of the long side to the length (e.g., thickness) B of the short side of the rectangle is calculated as an aspect ratio. The obtained aspect ratios are arithmetically averaged, and thus, an average aspect ratio can be determined.

In a preferable embodiment, the conductive powder does not contain squamous conductive particles. Specifically, the conductive powder preferably does not contain conductive particles having an aspect ratio of more than 10 (typically more than 5, preferably more than 3, for example, more than 2). In other words, the conductive powder is composed of spherical or approximately spherical (e.g., aspect ratio of 1.0 to 2.0) conductive particles. Accordingly, detachability from a printing plate (removal from a mesh) at the time of printing is favorable, and the printing accuracy and the smoothness of the surface of the conductive film can be improved. Moreover, the laser processability of the conductive film is further improved, and a thin line electrode wiring with a stable processing line width can be formed.

That is, the area of one particle of conductive particles having a high aspect ratio tends to be large, in general, in a planar view. Therefore, the conductive particles are present in the state of a part remaining as an electrode wiring and a part removed by laser processing (part to be irradiated with a laser). According to the inventors of the present invention, when a part is irradiated with a laser beam in this state, heat is conducted to the conductive particles remaining as an electrode wiring, and the conductive film is cut away beyond necessity in some cases. As a result, in some cases, the width of the electrode wiring is lower than the prescribed width, the electrode wiring is disconnected, or the surface of the conductive film is in a rough state. When the conductive powder does not contain squamous conductive particles, the proportion of such defect parts can be significantly reduced.

The average particle diameter of the conductive powder is not limited to particular average particle diameters and is generally smaller than the thickness of the entire conductive film. As preferred examples, the average particle diameter is about 0.1 µm or more, preferably 0.5 µm or more, 5 µm or less, preferably 3 µm or less, for example 2.2 µm or less.

When the average particle diameter is a prescribed value or more, the number of contact points between particles in the electrode is reduced, and the internal resistance is reduced. Therefore, a high electric conductivity can be achieved. Moreover, the generation of a flocculation in the paste is suppressed, and homogeneity and dispersibility can be improved. Moreover, the viscosity of the paste is preferably suppressed, and for example, the handleability of the paste and the workability at the time of printing the paste also can be improved.

When the average particle diameter is a predetermined value or less, a thin film electrode wiring or a thin line electrode wiring can be formed more stably. Moreover, for example, conductive particles in the state of stretching between a part remaining as an electrode and a part thermally decomposed at the time of laser processing can be effectively reduced. Therefore, the laser processability is improved, a thin line electrode wiring can be formed stably.

In the description, the "average particle diameter" refers to a particle diameter $D_{50}$ (median diameter) corresponding to the 50% cumulative diameter from the smallest particle diameter in a particle size distribution in the volumetric basis based on the laser diffraction-light scattering method.

In a preferable embodiment, the conductive particles configuring the conductive powder include a film containing fatty acid on the surface. According to the configuration, the hydroxyl group on the surfaces of the conductive particles is increased, and hydrophilicity is enhanced. The heat curable resin typically is hydrophobic. Accordingly, the wettability of the conductive particles and the heat curable resin is reduced. As a result, the heat curable resin is less prone to be clung to the conductive particles, and the contact points between the conductive particles are easily formed. Therefore, a conductive film having further superior electric conductivity can be formed. Examples of the fatty acid include saturated higher fatty acid or unsaturated fatty acid, having a carbon number of 10 or more. From the viewpoint of exerting the effect at a high level, polyunsaturated fatty acid such as alkyl succinic acid or alkenyl succinic acid is favorable.

The proportion of the conductive powder in the entire conductive film is not limited to particular proportions and is generally 50 mass % or more, typically 60 to 95 mass %, for example, 70 to 90 mass %. When the proportion satisfies the range, the conductive film having the characteristics is favorably achieved. Moreover, there is an effect of improving the workability and productivity (specifically, handleability of the paste) at the time of forming the conductive film.

<Cured Product of Heat Curable Resin>

The cured product of the heat curable resin is obtained by curing the heat curable resin with an appropriate curing agent. The heat curable resin is a component for fixing the conductive powder on the substrate. Moreover, the heat curable resin is a component for implementing adhesion between the flexible substrate and the conductive film to integrate the former and the latter. When the heat curable resin is cured, a net-like crosslinking structure is formed between molecules of the resin. The cured product of the heat curable resin is difficult to be dissolved in a solvent, and the plasticity does not appear (the cured product is not deformed) even when the cured product is heated. Therefore, the shape stability is high, and for example, superior heat resistance, chemical resistance, film hardness, and mechanical durability can be achieved compared with the case of using a thermoplastic resin.

The heat curable resin is not limited to particular heat curable resins, and any of conventionally-known heat curable resins can be used as appropriate according to the purpose of use. Preferred examples of the heat curable resin include an epoxy resin, a novolac resin, a resol resin, a phenolic resin such as an alkyl phenol resin, a urea resin, a melamine resin, an alkyd resin, a silicon resin, and an urethane resin. These heat curable resins may be used alone or in a combination of two or more of them. Among them, from the viewpoint of the laser processability (thermal decomposability) and adhesiveness, an epoxy resin or a phenolic resin is preferable.

<(a) Epoxy Resin>

In a preferable embodiment, the heat curable resin contains (a) epoxy resin. The epoxy resin mentioned herein refers to a general compound having one or more epoxy groups that is a three-membered ring in a molecule. The epoxy resin is superior in adhesiveness, heat resistance, chemical resistance, and mechanical durability among heat curable resins. Therefore, by containing an epoxy resin, an electrode wiring further superior in durability characteristics and reliability can be achieved.

The epoxy equivalent weight of the epoxy resin is not limited to particular epoxy equivalent weights. For the purpose of exerting the characteristics (specifically adhesiveness) at a high level, the epoxy equivalent weight is approximately 100 to 3000 g/eq.

In the description, the "epoxy equivalent weight" is a value measured in accordance with JIS K7236 (2009).

In a preferable embodiment, (a) epoxy resin is a mixture containing (a1) a polyfunctional epoxy resin having two or more epoxy groups in a molecule and (a2) a monofunctional epoxy resin having one epoxy group in a molecule. Accordingly, the effect of the invention of the present application can be exerted at a high level.

That is, by using (a1) a polyfunctional epoxy resin, the film thickness of the electrode wiring is stably enhanced, and further superior mechanical durability can be achieved. On the other hand, (a1) a polyfunctional epoxy resin is rigid and has low fluidity (mobility) because of the skeleton structure. Thus, the adhesiveness with the flexible substrate is prone to be reduced. Moreover, a large amount of the resin remains in the contact points between conductive particles even after heat curing, and the volume resistance is prone to be increased. According to the study by the inventors of the present invention, such tendency of increasing the volume resistance can be specifically significant in the case of using the spherical or approximately spherical conductive powder disclosed herein.

Thus, (a2) a monofunctional epoxy resin is mixed in (a1) a polyfunctional epoxy resin. Accordingly, the adhesiveness with the flexible substrate can be improved by imparting appropriate softness to the conductive film. Moreover, by enhancing flexibility (softness) of the resin, the resin present in the contact points between conductive particles is removed (excluded), and the contact area between conductive particles is increased. Therefore, the volume resistance can be further reduced.

<(a1) Polyfunctional Epoxy Resin>

The polyfunctional epoxy resin has a rigid skeleton structure. The polyfunctional epoxy resin has a function of imparting heat resistance, chemical resistance, and toughness to the conductive film. Accordingly, the film hardness and the shape stability are enhanced, and a conductive film having further superior mechanical durability can be achieved.

The polyfunctional epoxy resin is only necessary to be a compound having two or more epoxy groups, and any of conventionally-known compounds can be used as appropriate. Preferred examples of the polyfunctional epoxy resin include a bisphenol A-based epoxy resin, a bisphenol F-based epoxy resin, a phenol novolac-based epoxy resin, a cresol novolac-based epoxy resin, a naphthalene-based epoxy resin, a dicyclopentadiene-based epoxy resin, a trisphenol methane-based epoxy resin, a phenol aralkyl-based epoxy resin, a polyfunctional phenol-based epoxy resin, a biphenyl-based epoxy resin, a glycidyl ester-based epoxy resin, a glycidyl amine-based epoxy resin, an anthracene-based epoxy resin, a hydroquinone-based epoxy resin, and modifications thereof. These resins may be used alone or in a combination of two or more of them.

Among them, from the viewpoint of availability, a novolac-based epoxy resin, a dicyclopentadiene-based epoxy resin, or a bisphenol-based epoxy resin is preferable. From the viewpoint of reducing the volume resistance, a novolac-based epoxy resin is particularly preferable.

The epoxy equivalent weight of the polyfunctional epoxy resin is not limited to particular epoxy equivalent weights and is approximately 100 to 3000 g/eq, typically 100 to 1000 g/eq, for example, approximately 150 to 500 g/eq. When the epoxy equivalent weight is prescribed values or more, a function as an epoxy resin (i.e., the effects of improving adhesion and adhesivensss) is favorably exerted. When the epoxy equivalent weight is prescribed values or less, the conductive film having further superior durability and reliability can be achieved.

The number average molecular weight Mc of the polyfunctional epoxy resin is not limited to particular number average molecular weights and is approximately 10000 or less, preferably 5000 or less, typically 100 to 5000, more preferably 2000 or less, for example, approximately 300 to 1500. When the number average molecular weight Mc is prescribed values or more, the adhesion with the substrate and integrated shape of the electrode can be improved. When number average molecular weight Mc is prescribed values or less, detachability (disengaging ability) from the printing plate at the time of printing the paste is improved, and the printing accuracy is improved. Moreover, thermal decomposability is enhanced, and laser processability can be improved.

In the description, the "number average molecular weight Mc" is a number-basis average molecular weight converted using standard polystyrene calibration curve, measured by gel chromatography (GPC).

The proportion of the (a1) polyfunctional epoxy resin in the entire heat curable resin is not limited to particular proportions and is typically 5 mass % or more, preferably 7 mass % or more, for example, 10 mass % or more, and approximately 30 mass % or less, preferably 25 mass % or less, for example 23 mass % or less. Accordingly, the conductive film superior in heat resistance, chemical resistance, and film hardness can be achieved more stably.

<(a2) Monofunctional Epoxy Resin>

The monofunctional epoxy resin is a component that imparts fluidity to the paste and causes the paste viscosity to be reduced. The monofunctional epoxy resin also is a component that reduces the glass-transition temperature of the paste. By reducing the glass viscosity, the flexibility of the epoxy resin is enhanced, and the epoxy resin easily flows at the time of heat curing of the paste. As the result, the effect of removing (excluding) the resins intervening in the contact points between conductive particles can be obtained. Therefore, the contact area between conductive particles is increased, and the volume resistance can be further reduced. Moreover, the handleability of the paste and the workability at the time of printing the paste can be improved. This is preferable also from the viewpoint of forming a thin film-shaped (e.g., the thickness of 10 μm or less) conductive film appropriate for laser processing, for example.

The monofunctional epoxy resin (epoxy resin having a single functional group) is only necessary to be a compound having one epoxy group in a molecule, and any of conventionally-known compounds can be used as appropriate. Preferred examples of the monofunctional epoxy resin include glycidyl ether-based epoxy resins such as an alkyl glycidyl ether, alkylphenyl glycidyl ether, alkenyl glycidyl ether, alkynyl glycidyl ether, phenyl glycidyl ether and the like, having 6 to 36 (typically 6 to 26, e.g. 6 to 18) carbon atoms; glycidyl ester-based epoxy resins such as an alkyl glycidyl ester, alkenyl glycidyl ester, phenyl glycidyl ester and the like, having 6 to 36 (typically 6 to 26, e.g. 6 to 18) carbon atoms; and the like. These may be used alone or in a combination of two or more of them.

Among them, for the purpose of exerting the effects of the present invention at a high level, an alkyl glycidyl ether, phenyl glycidyl ether, alkyl glycidyl ester, or phenyl glycidyl ester is preferable. Phenyl glycidyl ether is particularly preferable.

The epoxy equivalent weight of the monofunctional epoxy resin is not limited to particular epoxy equivalent weights and is typically approximately the same as that of (a1) above. For the purpose of exerting the effects of the present invention at a high level, the epoxy equivalent weight is approximately 100 to 3000 g/eq, typically 100 to 1000 g/eq, for example, approximately 100 to 500 g/eq.

The number average molecular weight Mc of the monofunctional epoxy resin is not limited to particular number average molecular weights and is typically smaller than that of (a1) above. For the purpose of exerting the effects of the present invention at a high level, the number average molecular weight Mc is approximately 5000 or less, typically 2000 or less, preferably 1000 or less, for example, approximately 100 to 300.

The proportion of (a2) a monofunctional epoxy resin in the entire heat curable resin is not limited to particular proportions and is typically 40 mass % or more, preferably 45 mass % or more, for example, 50 mass % or more, and approximately 80 mass % or less, preferably 75 mass % or less, for example, 70 mass % or less. In a preferable embodiment, the mass ratio between (a1) polyfunctional epoxy resin and (a2) a monofunctional epoxy resin is about 20:80 to 45:55. Accordingly, the conductive film superior in electric conductivity and durability can be achieved more stably.

<(a3) Flexible Epoxy Resin>

In a preferable embodiment, (a) epoxy resin contains a flexible epoxy resin having a structure of (a3) three or more consecutive secondary carbons.

The flexible epoxy resin has a (soft) structure of three or more consecutive secondary carbons. Therefore, the flexible epoxy resin has "flexibility" described below and exerts a function of reducing rigidity deriving from the above (a1) and imparting appropriate flexibility and elasticity to the conductive film. Accordingly, the adhesivensss between the conductive film and the flexible substrate is improved. For example, when the flexible substrate is shrunk, warped, deformed, and the like at the time of producing (assembling), using, and the like of an electric equipment, the conductive film can flexibly comply with the movement of the flexible substrate. Therefore, peeling of the conductive film is favorably suppressed, and further superior durability and reliability can be achieved.

The flexible epoxy resin is only necessary to be a flexible compound having a structure part (segment) of three or more consecutive secondary carbons, and any of conventionally-known compounds can be used. The flexible epoxy resin mentioned herein typically has a structure part of at least 3 consecutive repeating units of $CH_2$ (i.e., a structure part represented by $-(CH_2)_n-$, is an actual number satisfying n≥3). Although the structure part of consecutive repeating units is typically included in a main skeleton in which the carbon number is maximum, the structure part may be, for example, present in extension from the main skeleton and the side chain (pendant position) extending from the main skeleton so as to be in a branch state.

In a preferable embodiment, the number (n) of consecutive repeating units is n≥4, particularly n≥5. Accordingly, the flexibility of the electrode is favorably improved, and the adhesiveness with the flexible substrate can be further improved. The upper limit of the number (n) of consecutive repeating units is not limited to particular numbers and is approximately n≥10 from the viewpoint of favorably maintaining the characteristics of (a1) above and favorably exerting the characteristics of (a3) above. In the case of randomly presenting consecutive secondary carbons in one compound, the lowest number of consecutive secondary carbons is the "consecutive number".

The proportion of the repeating unit in the flexible epoxy resin is not limited to particular proportions and is, for example, approximately 5 to 90 mass %.

Preferable examples of the flexible epoxy resin include chain alicyclic epoxy resins such as a dimer acid-based epoxy resin and a bisphenol modified epoxy resin and modified epoxy resins such as urethane-modified epoxy resin and rubber-modified epoxy resin. There resins may be used alone or in a combination of two or more of them.

Among them, from the viewpoint of improving conductivity and curable ability and the like, the dimer acid-based epoxy resin or the bisphenol modified epoxy resin is preferable.

The epoxy equivalent weight of the flexible epoxy resin is not limited to particular epoxy equivalent weights and is typically higher than (a1) above. For the purpose of exerting the effects of the present invention at a high level, the epoxy equivalent weight is approximately 200 to 3000 g/eq, typically 300 to 2000 g/eq, for example, about 350 to 1000 g/eq.

The number average molecular weight Mc of the flexible epoxy resin is not limited to particular number average molecular weights and is approximately 10000 or less, preferably 5000 or less, typically 100 to 5000, more preferably 2000 or less, for example, about 500 to 1000. When the number average molecular weight Mc is the predetermined values or more, the effect of improving flexibility can be favorably obtained. When the number average molecular weight Mc is the predetermined values or less, the handleability of the paste and the workability at the time of printing can be improved.

The "flexibility" of the epoxy resin can be evaluated by following tests.

An epoxy resin (single body) and a curing agent are cured to produce a resin film. This resin film is cut in a size of a width of 10 mm, a length of 40 mm, and a thickness of 1 mm to form a sample piece. Subsequently, the sample piece is curved to follow the profile of a cylindrical test member with a radius of curvature 25 mm (curvature 0.04/mm). When defects such as cracks and fractures are not observed after curving the sample piece, the sample piece is evaluated as "satisfactory". 10 test pieces are subjected to this test, and when all of 10 test pieces of are evaluated as "satisfactory", the epoxy resin is regarded as "having flexibility (Good)". On the other hand, when a defect is observed in any one of the 10 test pieces, the epoxy resin is regarded as "having no flexibility". The specific evaluation method is shown in the worked examples described below.

In a preferable embodiment, the flexibility of the epoxy resin is higher, and when 10 sample pieces are curved to follow the profile of the cylindrical test members having, for example, a radius of curvature of 15 mm (curvature 0.06/mm) and a radius of curvature of 10 mm (curvature 0.1/mm), all of the 10 test pieces are evaluated as "satisfactory". Such epoxy resins are regarded as "having favorable flexibility (Great)" and "having extremely favorable flexibility (Excellent)".

In a further preferable embodiment, the flexibility of the epoxy resin is significantly high, and for example, when 10 test pieces are bent at 180° so as to cause both ends in the length direction to be in contact with each other, all of the 10 test pieces are evaluated as "satisfactory". Such epoxy resin can be regarded as "having particularly favorable flexibility (Brilliant)".

The proportion of the (a3) flexible epoxy resin in the entire heat curable resin is not limited to particular proportions and is typically 1 mass % or more, preferably 2 mass % or more, for example, 4 mass % or more, and approximately 45 mass % or less, preferably 40 mass % or less, for example, 35 mass % or less. Accordingly, the conductive film exhibits high flexibility, and superior adhesiveness with the flexible substrate can be achieved.

<(b) Epoxy Group-Containing Acrylic Resin>

In a preferable embodiment, the heat curable resin contains (b) an epoxy group-containing acrylic resin having one or more epoxy groups in addition to (a) epoxy resin.

The epoxy group-containing acrylic resin acts to contribute to the improvement in adhesiveness of the flexible substrate and the conductive film and the improvement in smoothness of the surface of the conductive film.

That is, the epoxy group-containing acrylic resin contains an epoxy group and thus is fit in the epoxy resin. In the state of heat-curing the coating, a curing reaction of the epoxy group occurs, and a three-dimensional crosslinking structure with the epoxy resin is formed. Accordingly, the adhesiveness of the conductive film and the flexible substrate is further improved.

A part of the epoxy group-containing acrylic resin comes up to the surface of the coating before completely curing the resin component and may function as homogenizing the surface tension of the coating. In other words, the epoxy group-containing acrylic resin can function as a so-called surface conditioner (leveling agent). Accordingly, the smoothness of the surface of the conductive film is further improved.

The epoxy group-containing acrylic resin is only necessary to be a compound having one or more epoxy groups in the end and/or the side chain (pendant position) of the main chain skeleton of the acrylic resin, and any of conventionally-known compounds can be used as appropriate.

Preferred examples of the epoxy group-containing acrylic resin include a homopolymer of the epoxy group-containing polymerizable monomer and a copolymer of the epoxy group-containing polymerizable monomer and another polymerizable monomer.

Examples of the epoxy group-containing polymerizable monomer include glycidyl(meth)acrylate, glycidyl methacrylate (GMA), α-methyl glycidyl methacrylate, 3,4-epoxy cyclohexyl methyl methacrylate, vinyl glycidyl ether, and allyl glycidyl ether. Among them, containing glycidyl methacrylate is preferable.

Examples of the other polymerizable monomers include (meth)acrylic acid; acrylic acid esters such as (meth)acrylic acid methyl, (meth) acrylic acid ethyl, (meth)acrylic acid n-propyl, (meth)acrylic acid n-butyl, (meth)acrylic acid i-butyl, (meth)acrylic acid t-butyl (TBA), (meth)acrylic acid pentyl, (meth)acrylic acid n-hexyl, (meth)acrylic acid 2-ethylhexyl, (meth)acrylic acid n-octyl, (meth)acrylic acid butoxyethyl, (meth)acrylic acid phenyl, (meth)acrylic acid cyclopentyl, (meth)acrylic acid cyclohexyl, (meth)acrylic acid methylcyclohexyl, (meth)acrylic acid trimethylhexyl, (meth)acrylic acid benzyl, and (meth)acrylic acid naphthyl; methacrylic acid; methacrylic acid esters such as methyl methacrylate (MMA), ethyl methacrylate, n-propyl methacrylate, n-butyl methacrylate, i-butyl methacrylate, t-butyl methacrylate, pentyl methacrylate, n-hexyl methacrylate, 2-ethylhexyl methacrylate, n-octyl methacrylate, butoxy ethyl methacrylate, phenyl methacrylate, cyclopentyl methacrylate, cyclohexyl methacrylate, methyl cyclohexyl methacrylate, trimethyl cyclohexyl methacrylate, isobornyl methacrylate, and naphthyl methacrylate; acrylonitril; vinyl acetate; styrene; and butadiene. Among them, containing at least one kind of acrylic acid, acrylic acid ester, methacrylic acid, and methacrylic acid ester is preferable.

The mixing ratio between the epoxy group-containing polymerizable monomer and another polymerizable monomer is not limited to particular mixing ratios and can be, as an approximate guide, approximately 3:1 to 1:3 as a preferred example, and is, for example, approximately 2:1 to 1:2. Accordingly, the effects of the present invention are exerted at a higher level.

The epoxy equivalent weight of the epoxy group-containing acrylic resin is not limited to particular epoxy equivalent weights and is typically higher than those of (a1) to (a3) above. For the purpose of exerting the effects of the present invention at a high level, the epoxy equivalent weight is approximately 200 to 3000 g/eq, typically 300 to 2000 g/eq, for example, about 400 to 1000 g/eq.

The number average molecular weight Mc of the epoxy group-containing acrylic resin is not limited to particular number average molecular weights and is typically higher than those of (a1) to (a3) above. For the purpose of exerting the effects of the present invention at a high level, the number average molecular weight Mc is approximately 10000 or less, typically 5000 or less, preferably 2000 or less, for example, about 100 to 1000.

The heat curable resin may or may not contain (b) an epoxy group-containing acrylic resin. In the case where the heat curable resin contains (b) an epoxy group-containing acrylic resin, the proportion of (b) an epoxy group-containing acrylic resin in the entire heat curable resin is not limited to particular proportions. For the purpose of exerting the effect caused by the addition at a high level, the proportion is typically 0.5 mass % or more, preferably 1 mass % or more, for example 5 mass % or more, and approximately 20 mass % or less, preferably 17 mass % or less, for example 15 mass % or less.

In a preferable embodiment, the heat curable resin contains, at a mass ratio, the following components:
   (a1) 5 to 25 mass % of polyfunctional epoxy resin having two or more epoxy groups;
   (a2) 50 to 80 mass % or monofunctional epoxy resin having one epoxy group;
   (a3) 1 to 45 mass % of flexible epoxy resin having a structure of three or more consecutive secondary carbons; and
   (b) 0 to 20 mass % of epoxy group-containing acrylic resin having one or more epoxy groups.

When the heat curable resin is composed at the component ratio, the conductive film having both of contradictory properties of "toughness" and "flexibility" at an extremely high level can be obtained.

The proportion of the cured product of the heat curable resin in the entire conductive film is not limited to particular proportions and is typically 3 mass % or more, preferably 5 mass % or more, for example, 7 mass % or more, and approximately 30 mass % or less, preferably 25 mass % or less, for example, 20 mass % or less. When the proportion satisfies the range, the characteristics of the conductive film can be included at a high level.

<Curing Agent>

The curing agent for curing a heat curable resin is not limited to particular agents, and an appropriate agent can be used according to the kind of the heat curable resin and the like. For example, in the case where an epoxy resin is used as the heat curable resin, a compound that can form a crosslinking structure by a reaction with an epoxy group of the epoxy resin can be used. Preferred examples of the curing agent include an imidazole-based curing agent, a phenol-based curing agent, an amine-based curing agent, an amide-based curing agent, organic phosphines, and derivatives thereof. These compounds may be used alone or in a combination of two or more of them.

<Other Components in Conductive Film>

In the conductive film disclosed herein, in addition to the conductive powder and the cured product of the heat curable resin, various components are contained intentionally or unintentionally. As these additional components, additives added for the purpose of improving various characteristics and remaining components in the conductive film as a reactive restudies can be considered. Examples of the additional component include an unreacted curing agent, a reaction accelerator (promoter), a laser beam absorption agent, an inorganic filler, a surfactant, a dispersant, a thickener, a defoamer, a plasticizer, a stabilizer, an antioxidant, and a pigment.

Examples of the reaction accelerator include alkoxyde containing a metal element such as zirconium (Zr), titanium (Ti), aluminium (Al), or tin (Sn), a chelate (complex), and acylate. These compounds may be used alone or in a combination of two or more of them. Among them, an organic zirconium compound is preferable.

<Use of Flexible Wiring Board>

The flexible wiring board disclosed herein is superior in durability and reliability. Therefore, the flexible wiring board can be preferably used for the case where impacts and loads are prone to be given by dropping and the like. Moreover, in a preferable embodiment, the flexible wiring board can be preferably used for forming a thin line electrode wiring that is superior in laser processability and specifically has L/S=80 μm/80 μm or less, for example, L/S=50 μm/50 μm or less. Therefore, the flexible wiring board can be preferably used for improving downsizing, reducing the weight, reducing the thickness, increasing the function, and the like.

Therefore, use of the flexible wiring board can be in, for example, a flexible device such as a touch panel, a liquid crystal display, or an organic EL display, mounted on a portable electronic equipment such as a mobile phone, a smart phone, a tablet PC, a notebook PC, an electronic paper, or a digital video camera. The "portable" means having portability at a level at which individuals (typically adults) can bring with them relatively easily.

FIG. 3 is a schematic perspective view showing a flexible wiring board 20 for touch panel according to an embodiment. In the embodiment, a flexible substrate 22a and another flexible substrate 22b are used in a state where these substrates are integrated facing each other. Each of two flexible substrates 22a and 22b is composed of a resin or a glass having high transparency. A transparent conductive layer (not shown) having a prescribed pattern (e.g., rectangular pattern or checkerboard pattern) is formed on each of the surfaces of the flexible substrates 22a and 22b. The transparent conducive layer is composed of the above-mentioned conductive material (e.g., ITO) or the like. Both ends in the longitudinal direction of the flexible substrates 22a and 22b are provided with conductive films 24a and 24b. Parts of the conductive films 24a and 24b are provided with extraction electrodes (terminals) 26a and 26b for connecting with an external circuit.

At the time of using a touch panel, an optional part (e.g., a position indicated by • (black circle)) of the flexible substrate 22a arranged on the front side of the touch panel is touched with a pen. Then, the touched part of the flexible substrate 22a is warped, and the conductive films 24a and 24b are brought into contact with each other in the part. Accordingly, the conduction is generated, and the touched position is detected.

Some worked examples are described below, relating to the present invention. However, the present invention does not intend to limited the features of the invention to examples shown in the worked examples.

I. Evaluation of Epoxy Resin

Four kinds of epoxy resins are prepared.

Flexible epoxy resin 1: dimer acid-based epoxy resin (the number of consecutive secondary carbons≥5)

Flexible epoxy resin 2: bisphenol modified epoxy resin (the number of consecutive secondary carbons≥4)

Flexible epoxy resin 3: hydrogenated bisphenol-based epoxy resin (the number of consecutive secondary carbons<3)

Polyfunctional epoxy resin: bisphenol-based epoxy resin (the number of consecutive secondary carbons<3)

Subsequently, each of the epoxy resins was cured with a curing agent (an imidazole-based curing agent was used herein) to form a resin film. This resin film was cut into a size of a width of 10 mm, a length of 40 mm, and a thickness of 1 mm, and 10 sample pieces were provided.

Moreover, a cylindrical test member having a following curvature was prepared.

Cylindrical members with radiuses of curvature of 25 mm, 15 mm, and 10 mm (curvatures 0.04/mm, 0.06/mm, 0.1/mm)

Then, each sample piece was curved to follow the profile of an arc shape of each cylindrical member. Thereafter, whether or not there are defects such as cracks and fractures in the sample piece after being curved was checked. The sample pieces that could be bent with a radius of curvature 10 mm were subjected to bending at 180°. The results are shown in Table 1. In Table 1, "A" indicates that no defect was found in any of the 10 sample pieces (all of 10 sample pieces were satisfactory products), "B" indicates that defects were found in one or two pieces out of the 10 sample pieces, and "C" indicates that defects were found in three or more of the 10 sample pieces.

TABLE 1

|  | Bending at 180° | Bending with curvature radius of 10 mm | Bending with curvature radius of 15 mm | Bending with curvature radius of 25 mm |
|---|---|---|---|---|
| Flexible epoxy resin 1 | A | A | A | A |
| Flexible epoxy resin 2 | — | B | A | A |
| Flexible epoxy resin 3 | — | — | C | A |
| Polyfunctional epoxy resin | — | C | C | B |

As shown in Table 1, the flexible epoxy resins 1 and 2 having 3 or more consecutive secondary carbons could be deformed follow the profile of the shape with a radius of curvature of 15 mm (curvature 0.06/mm), and thus, it can be said that the flexible epoxy resins have superior flexibility. According to the evaluation criteria of flexibility, the flexible epoxy resin 1 had "particularly favorable flexibility (Brilliant)", and the flexible epoxy resin 2 had "favorable flexibility (Great)".

As references, the flexural moduluses of three kinds of epoxy resins were measured using a viscoelasticity spectrometer (DMS). The results are shown in Table 2.

TABLE 2

|  | "Flexibility" evaluation criteria in the description | Flexural modulus (MPa) |
|---|---|---|
| Flexible epoxy resin 1 | Particularly favorable (Brilliant) | —(Unmeasurable) |
| Flexible epoxy resin 2 | Favorable (Great) | 3700 |
| Polyfunctional epoxy resin | None | 2600 |

As shown in Table 2, the tendencies of the evaluation results of "flexibility" in the description were different from those of the general measurement results of the flexural moduluses based on DMS. In other words, the "flexibility", which is defined herein, could not be inferred only from a general measurement indicator, "modulus".

II. Evaluation of Conductive Film

The following materials were preapred as ingredients to form the heat curable conductive pastes.

<<Conductive Powder>>

Conductive powder 1: spherical silver powder ("Ag-2-8" available from DOWA Electronics Materials Co., Ltd.; $D_{50}$=1.0 μm, 1.1 average aspect ratio)

Conductive powder 2: spherical silver powder ("Ag-2-1C" available from DOWA Electronics Materials Co., Ltd.; $D_{50}$=0.5 μm, 1.0 average aspect ratio)

Conductive powder 3: spherical silver powder ("Ag-5-8" available from DOWA Electronics Materials Co., Ltd.; $D_{50}$=3.0 μm, 1.1 average aspect ratio)

Conductive powder 4: spherical silver-coated copper powder ("AO-DCL-1" available from DOWA Electronics Materials Co., Ltd.; $D_{50}$=2.2 μm, 1.1 average aspect ratio)

Conductive powder 5: spherical silver-coated copper powder ("AO-DCL-2" available from DOWA Electronics Materials Co., Ltd.; $D_{50}$=2.2 μm, 1.1 average aspect ratio)

<<Heat Curable Resin>>

(a1) Polyfunctional Epoxy Resin

Polyfunctional epoxy resin 1: novolac-based epoxy resin (available from Nippon Kayaku Co., Ltd.; epoxy equivalent weight 193 g/eq, number average molecular weight Mc 1100)

Polyfunctional epoxy resin 2: dicyclopentadiene-based epoxy resin (available from DIC Corporation; epoxy equivalent weight 258 g/eq, number average molecular weight Mc 550)

Polyfunctional epoxy resin 3: bisphenol-based epoxy resin (available from ADEKA Corporation; epoxy equivalent weight 170 g/eq, number average molecular weight Mc 340)

(a2) Monofunctional Epoxy Resin

Phenyl glycidyl ether-based epoxy resin (available from ADEKA Corporation; epoxy equivalent weight 206 g/eq, number average molecular weight Mc 210)

(a3) Flexible Epoxy Resin

Flexible epoxy resin 1: dimer acid-based epoxy resin (available from Mitsubishi Chemical Corporation; epoxy equivalent weight 390 g/eq, number average molecular weight Mc 560, the number of consecutive secondary carbons≥5, particularly favorable flexibility (Brilliant))

Flexible epoxy resin 2: bisphenol modified epoxy resin (available from DIC Corporation; epoxy equivalent weight 403 g/eq, number average molecular weight Mc 900, the number of consecutive secondary carbons ≥4, favorable flexibility (Great))

Flexible epoxy resin 3: hydrogenerated bisphenol-based epoxy resin (available from Mitsubishi Chemical Corporation; epoxy equivalent weight 210 g/eq, number average molecular weight Mc 400, the number of consecutive secondary carbons<3)

(b) Epoxy Group-Containing Acrylic Resin

Epoxy group-containing acrylic resin 1: alkyl resin (epoxy equivalent weight 497 g/eq, number average molecular weight Mc 2500) produced of 50 parts of MMA and 50 parts of GMA by radical polymerization Epoxy group-containing acrylic resin 2: acrylic resin (epoxy equivalent weight 486 g/eq, number average molecular weight Mc 2400) produced of 50 parts of TBA and 50 parts of GMA by radical polymerization <<Thermoplastic Resin>>

Polyester resin 1 (available from Toyobo Co. Ltd.; number average molecular weight Mc 17000)

Polyester resin 2 (available from Hitachi Kasei Polymer Co. Ltd.; number average molecular weight Mc 2000)

Polyester resin 3 (available from DIC Corporation; number average molecular weight Mc 4500)

Urethane resin (available from Toyobo Co. Ltd., number average molecular weight Mc 40000)

<<Curing Agent>>

Curing agent 1: imidazole-based curing agent (available from Ajinomoto Fine-Techno Co., Inc.)

Curing agent 2: tertiary amine-based curing agent (available from Ajinomoto Fine-Techno Co., Inc.)

<<Additive>>

Zirconium-based chelate (available from Matsumoto Fine Chemical Co. Ltd.)

[Formation of Conductive Film]

In the case where the resin was a solid, the resin was dissolved in an organic dispersion medium (diethylene glycol monobutyl ether acetate was used herein), and heat curable conductive pastes (worked examples 1 to 18) were prepared by weighing and mixing the prepared materials such that the materials exhibit mass ratios shown in Table 3.

[Evaluation of Adhesivensss Based on 100 Squares Cross-Cut Test]

Each of the prepared pastes was daubed on the following three kinds of flexible substrates so as to form a 2 cm×2 cm square by screen printing and was heat-dried at 130° C. for 30 minutes. Then, an adhesiveness evaluation (cross-cut method-100 squares cross-cut test) was performed in accordance with JIS K5400 (1990). The results are shown in "Adhesiveness" rows in Table 3. Each value in Table 3 indicates the number of squares adhered, exhibiting no peeling. That is, 100 that is the maximum value was the highest, and the higher the value, more favorable the adhesivensss is.

<<Flexible Substrate>>

ITO-PET film (available from OIKE & Co., Ltd., a film of indium tin oxide, formed on polyethylene terephthalate)

PET film (available from Toray Industries, Inc., annealing-treated)

Polycarbonate film (available from Asahi Glass Co., Ltd.)

[Evaluation of Pencil Hardness]

The conductive films on the PET film were subjected to the pencil scratch hardness test in accordance with JIS K5600 5-4 (1999) using a TQC ISO pencil scratch hardness test tester (model: "VF-2378", available from COTEC) (see FIG. 2). The results are shown in "Pencil hardness" rows in Table 3.

[Measurement of Volume Resistivity]

The conductive films on the PET film were subjected to volume resistivity measurement by four-terminal method, using a resistivity meter (model: LORESTA GP MCP-T610, available from Mitsubishi Chemical Analytech Co., Ltd). The results are shown in "Volume resistivity" rows in Table 3.

[Evaluation of Laser Processability]

Each prepared paste was screen-printed (daubed) on the surface of an ITO-PET film by screen printing and heat-dried at 130° C. for 30 minutes. Accordingly, the epoxy resin was cured, and a conductive film was formed on the ITO-PET film.

The formed conductive film was irradiated with laser under following nine conditions to form a thin line of L/S=30 μm/30 μm.

<<Laser Processing Conditions (9 Conditions)>>

Type of laser: IR laser (basic wavelength: 1064 nm)

Laser output: 5 W, 7 W, 9 W

Scanning speed: 1000, 2000, 3000 mm/s

The thin line formed by laser processing was observed with a laser microscope to determine whether or not electrode wiring with a desired line width was formed. The microscope observation was performed at a magnification of 1000 with 3 visual fields. The results are shown in "Laser processability" in Table 3. In Table 3, "A" indicates that a thin line could be formed under all the conditions, "B" indicates that a thin line could be formed under the partial conditions, and "C" indicates that a thin line could not be formed.

Moreover, as an example, an observation image according Example 1 is shown in FIG. 4.

TABLE 3

| | | D50 (μm) | Shape | Ex. 1 | Ex. 2 | Ex. 3 | Ex. 4 | Ex. 5 | Ex. 6 |
|---|---|---|---|---|---|---|---|---|---|
| Composition (parts by mass) | Conductive powder 1 | 1.0 | Spherical | 100 | 100 | 100 | 100 | 100 | 100 |
| | Conductive powder 2 | 0.5 | Spherical | — | — | — | — | — | — |
| | Conductive powder 3 | 3.0 | Spherical | — | — | — | — | — | — |
| | Conductive powder 4 | 2.2 | Spherical | — | — | — | — | — | — |
| | Conductive powder 5 | 2.2 | Spherical | — | — | — | — | — | — |
| (a1) | Polyfunctional epoxy resin 1 | Mc = 1100 | | 3.3 | — | — | — | — | 3.3 |
| | Polyfunctional epoxy resin 2 | Mc = 550 | | — | 3.3 | 3.3 | — | 1.7 | — |
| | Polyfunctional epoxy resin 3 | Mc = 340 | | — | — | — | 3.3 | — | — |
| (a2) | Monofunctional epoxy resin | Mc = 210 | | 10 | 10 | 10 | 10 | 10 | 10 |
| (a3) | Flexible epoxy resin 1 | Mc = 560 | | 3.3 | 3.3 | — | — | 3.3 | 1.6 |
| | Flexible epoxy resin 2 | Mc = 900 | | — | — | 3.3 | 3.3 | — | — |
| | Flexible epoxy resin 3 | Mc = 400 | | — | — | — | — | — | — |
| (b) | Epoxy group-containing acrylic resin 1 | Mc = 2500 | | — | — | — | — | 1.6 | — |

TABLE 3-continued

| | | | | | | | | |
|---|---|---|---|---|---|---|---|---|
| | Epoxy group-containing acrylic resin 2 | Mc = 2400 | — | — | — | — | — | 1.6 |
| | Total of heat curable resin | | 16.6 | 16.6 | 16.6 | 16.6 | 16.6 | 16.5 |
| heat plasticity | Polyester resin 1 | Mc = 17000 | — | — | — | — | — | — |
| | Polyester resin 2 | Mc = 2000 | — | — | — | — | — | — |
| | Polyester resin 3 | Mc = 4500 | — | — | — | — | — | — |
| | Urethane resin | Mc = 40000 | — | — | — | — | — | — |
| | Curing agent 1 (imidazole-based curing agent) | | 2.5 | 3.3 | — | — | 1.7 | 3.3 |
| | Curing agent 2 (Tertiary amine-based curing agent) | | — | — | 3.3 | 4.2 | 1.7 | — |
| | Additive (Catalyst) | | 5.0 | 5.0 | 5.0 | 5.0 | 5.0 | 5.0 |
| Proportion in heat curable resin component (mass %) | (a1) Polyfunctional epoxy resin | | 20% | 20% | 20% | 20% | 10% | 20% |
| | (a2) Monofunctional epoxy resin | | 60% | 60% | 60% | 60% | 60% | 61% |
| | (a3) Flexible epoxy resin | | 20% | 20% | 20% | 20% | 20% | 10% |
| | (b) Epoxy group-containing acrylic resin | | 0% | 0% | 0% | 0% | 10% | 10% |
| Adhesivensss (ITO-PET substrate) 100 squares cross-cut test | | | 100 | 100 | 100 | 100 | 100 | 100 |
| Adhesiveness (PET substrate) 100 squares cross-cut test | | | 100 | 100 | 100 | 100 | 100 | 100 |
| Adhesivensss (Polycarbonate substrate) 100 squares cross-cut test | | | 100 | 100 | 100 | 100 | 100 | 100 |
| Volume resistivity (μΩ · cm), 130° C., 30 min | | | 35 | 57 | 54 | 58 | 49 | 44 |
| Pencil hardness | | | 3H | 3H | 4H | 2H | 3H | 4H |
| Laser processability | | | A | A | A | A | A | A |

| | | D50 (μm) | Shape | Ex. 7 | Ex. 8 | Ex. 9 | Ex. 10 | Ex. 11 | Ex. 12 |
|---|---|---|---|---|---|---|---|---|---|
| Composition (parts by mass) | Conductive powder 1 | 1.0 | Spherical | — | — | — | — | 100 | 100 |
| | Conductive powder 2 | 0.5 | Spherical | 100 | — | — | — | — | — |
| | Conductive powder 3 | 3.0 | Spherical | — | 100 | — | — | — | — |
| | Conductive powder 4 | 2.2 | Spherical | — | — | 100 | — | — | — |
| | Conductive powder 5 | 2.2 | Spherical | — | — | — | 100 | — | — |
| (a1) | Polyfunctional epoxy resin 1 | Mc = 1100 | | — | — | — | 2 | — | — |
| | Polyfunctional epoxy resin 2 | Mc = 550 | | — | 1.7 | — | — | — | — |
| | Polyfunctional epoxy resin 3 | Mc = 340 | | 5 | — | 2.5 | — | — | — |
| (a2) | Monofunctional epoxy resin | Mc = 210 | | 15 | 5 | 5 | 7 | — | — |
| (a3) | Flexible epoxy resin 1 | Mc = 560 | | 1.2 | — | — | — | — | — |
| | Flexible epoxy resin 2 | Mc = 900 | | — | 1.2 | 2.5 | 2 | — | — |
| | Flexible epoxy resin 3 | Mc = 400 | | — | — | — | — | — | — |
| (b) | Epoxy group-containing acrylic resin 1 | Mc = 2500 | | 3.6 | 0.4 | 1 | — | — | — |
| | Epoxy group-containing acrylic resin 2 | Mc = 2400 | | — | — | — | — | — | — |
| | Total of heat curable resin | | | 24.8 | 8.3 | 11 | 11 | 0 | 0 |
| heat plasticity | Polyester resin 1 | Mc = 17000 | | — | — | — | — | 5 | 10 |
| | Polyester resin 2 | Mc = 2000 | | — | — | — | — | — | — |
| | Polyester resin 3 | Mc = 4500 | | — | — | — | — | — | — |
| | Urethane resin | Mc = 40000 | | — | — | — | — | — | — |
| | Curing agent 1 (imidazole-based curing agent) | | | — | 1.7 | — | 1.7 | — | — |
| | Curing agent 2 (Tertiary amine-based curing agent) | | | 5 | — | 1.7 | 1.7 | — | — |
| | Additive (Catalyst) | | | 7.0 | 2.5 | 3.0 | 3.0 | 0.5 | 1.0 |
| Proportion in heat curable resin component (mass %) | (a1) Polyfunctional epoxy resin | | | 20% | 20% | 23% | 18% | — | — |
| | (a2) Monofunctional epoxy resin | | | 60% | 60% | 45% | 64% | — | — |
| | (a3) Flexible epoxy resin | | | 5% | 14% | 23% | 18% | — | — |
| | (b) Epoxy group-containing acrylic resin | | | 15% | 5% | 9% | 0% | — | — |
| Adhesivensss (ITO-PET substrate) 100 squares cross-cut test | | | | 100 | 100 | 100 | 100 | 100 | 100 |
| Adhesiveness (PET substrate) 100 squares cross-cut test | | | | 100 | 100 | 100 | 100 | 100 | 100 |
| Adhesivensss (Polycarbonate substrate) 100 squares cross-cut test | | | | 100 | 100 | 100 | 100 | 100 | 100 |
| Volume resistivity (μΩ · cm), 130° C., 30 min | | | | 46 | 63 | 89 | 92 | 38 | 67 |
| Pencil hardness | | | | 2H | 4H | 3H | 3H | HB | H |
| Laser processability | | | | A | A | A | A | A | A |

| | | D50 (μm) | Shape | Ex. 13 | Ex. 14 | Ex. 15 | Ex. 16 | Ex. 17 | Ex. 18 |
|---|---|---|---|---|---|---|---|---|---|
| Composition (parts by mass) | Conductive powder 1 | 1.0 | Spherical | 100 | — | — | — | 100 | 100 |
| | Conductive powder 2 | 0.5 | Spherical | — | 100 | — | — | — | — |
| | Conductive powder 3 | 3.0 | Spherical | — | — | 100 | — | — | — |
| | Conductive powder 4 | 2.2 | Spherical | — | — | — | 100 | — | — |
| | Conductive powder 5 | 2.2 | Spherical | — | — | — | — | — | — |
| (a1) | Polyfunctional epoxy resin 1 | Mc = 1100 | | — | — | — | — | — | 4.3 |
| | Polyfunctional epoxy resin 2 | Mc = 550 | | — | — | — | — | — | — |
| | Polyfunctional epoxy resin 3 | Mc = 340 | | — | — | — | — | 3.3 | — |
| (a2) | Monofunctional epoxy resin | Mc = 210 | | — | — | — | — | 10 | 13 |
| (a3) | Flexible epoxy resin 1 | Mc = 560 | | — | — | — | — | — | — |
| | Flexible epoxy resin 2 | Mc = 900 | | — | — | — | — | — | — |
| | Flexible epoxy resin 3 | Mc = 400 | | — | — | — | — | 3.3 | — |
| (b) | Epoxy group-containing acrylic resin 1 | Mc = 2500 | | — | — | — | — | — | — |

TABLE 3-continued

| | | | | | | | | |
|---|---|---|---|---|---|---|---|---|
| | Epoxy group-containing acrylic resin 2 | Mc = 2400 | — | — | — | — | — | — |
| | Total of heat curable resin | | 0 | 0 | 0 | 0 | 16.6 | 17.3 |
| heat plasticity | Polyester resin 1 | Mc = 17000 | 15 | — | — | — | — | — |
| | Polyester resin 2 | Mc = 2000 | — | 10 | — | — | — | — |
| | Polyester resin 3 | Mc = 4500 | — | — | 10 | — | — | — |
| | Urethane resin | Mc = 40000 | — | — | — | 10 | — | — |
| Curing agent 1 (imidazole-based curing agent) | | | — | — | — | — | 3.3 | 2.6 |
| Curing agent 2 (Tertiary amine-based curing agent) | | | — | — | — | — | — | — |
| | Additive (Catalyst) | | 1.5 | 3.0 | 2.0 | 0.8 | 5.0 | 1.7 |
| Proportion in heat curable resin component (mass %) | (a1) Polyfunctional epoxy resin | | — | — | — | — | 20% | 25% |
| | (a2) Monofunctional epoxy resin | | — | — | — | — | 60% | 75% |
| | (a3) Flexible epoxy resin | | — | — | — | — | 20% | 0% |
| | (b) Epoxy group-containing acrylic resin | | — | — | — | — | 0% | 0% |
| Adhesivensss (ITO-PET substrate) 100 squares cross-cut test | | | 100 | 100 | 100 | 100 | 55 | 20 |
| Adhesiveness (PET substrate) 100 squares cross-cut test | | | 100 | 100 | 100 | 100 | 90 | 70 |
| Adhesivensss (Polycarbonate substrate) 100 squares cross-cut test | | | 100 | 100 | 100 | 100 | 60 | 45 |
| Volume resistivity (μΩ·cm), 130° C., 30 min | | | 120 | 61 | 92 | 99 | 84 | 51* |
| Pencil hardness | | | H | HB | H | HB | 4H | 3H |
| Laser processability | | | A | A | A | A | A | A |

*Heat-drying conditions: 150° C., 30 min

As shown in Table 3, in each of the worked examples 11 to 16 using a thermoplastic resin (a polyester resin or a urethane resin), the film hardness was H or less, and the mechanical strength lacked. In each of the worked examples 17 and 18, the adhesiveness with the flexible substrate lacked.

Compared with these comparative examples, in each of the worked examples 1 to 10, the high film hardness—at least 2H—was exhibited, and the adhesiveness with the flexible substrate was favorable. Moreover, the low volume resistivity (heat-curing conditions: 130° C., 30 minutes)—100 μΩ·cm or less—was exhibited. Furthermore, the laser processability was favorable.

[Measurement of Surface Roughness Ra]

The conductive films of worked examples 1 and 5 were subjected to the surface roughness Ra measurement in accordance with JIS B0601 (2001).

As a result, in the worked example 1 containing no epoxy group-containing acrylic resin, Ra was 0.8 μm, and in the worked example 5 containing no epoxy group-containing acrylic resin, Ra was 0.7 μm. That is, by adding the epoxy group-containing acrylic resin, the flatness of the surface of the electrode could be enhanced. Although the reason of this are not clear, this was assumed because a part of the epoxy group-containing acrylic resin came up to the surface of the coating, and the epoxy group-containing acrylic resin could function as an acrylic leveling agent.

Although the present invention is described in detail above, these are merely examples. Various modifications can be made to the present invention within the scope of claims.

REFERENCE SIGNS LIST 10, 10' flexible wiring board
12, 12' flexible substrate
14, 14' conductive film
16' pencil scratch hardness tester
18' pencil
20 flexible wiring board for touch panel
22a, b flexible substrate (resin substrate)
24a, b conductive film
26a, b extraction electrode (terminal)

The invention claimed is:

1. A flexible wiring board comprising: a flexible substrate; and a conductive film formed on the flexible substrate, wherein
   the conductive film contains a conductive powder and a cured product of a heat curable resin and has following characteristics:
   (1) pencil hardness of at least 3H, based on a pencil scratch hardness test in accordance with JIS K5600 5-4 (1999);
   (2) adhesiveness of at least 95/100 by a 100 squares cross-cut test in accordance with JIS K5400 (1990); and
   the heat curable resin comprises (a) an epoxy resin.

2. The flexible wiring board according to claim 1, wherein the conductive film has adhesiveness of at least 99/100 by the 100 squares cross-cut test.

3. The flexible wiring board according to claim 1, wherein a volume resistivity after heat-dried at 130° C. for 30 minutes of the conductive film is 100μΩ·cm or less.

4. The flexible wiring board according to claim 3, wherein the volume resistivity is 80 μΩ·cm or less.

5. The flexible wiring board according to claim 3, wherein the volume resistivity is 60 μΩ·cm or less.

6. The flexible wiring board according to claim 3, wherein the volume resistivity is 50 μΩ·cm or less.

7. The flexible wiring board according to claim 1, wherein the heat curable resin additionally comprises (b) an epoxy group-containing acrylic resin having one or more epoxy groups, as a second heat curable resin.

8. The flexible wiring board according to claim 1, wherein an average aspect ratio of the conductive powder is 1.0 to 1.5.

9. The flexible wiring board according to claim 1, wherein an average particle diameter of the conductive powder, based on a laser diffraction-light scattering method, is 0.5 to 3 μm.

10. The flexible wiring board according to claim 1, wherein the conductive powder does not comprise squamous conductive particles.

11. A portable electronic equipment comprising the flexible wiring board according to claim 1.

12. The flexible wiring board according to claim 1, wherein the adhesiveness is 100/100.

13. The flexible wiring board according to claim 1, wherein the epoxy resin comprises:
   (a1) a polyfunctional epoxy resin having two or more epoxy groups; and
   (a2) a monofunctional epoxy resin having one epoxy group.

14. The flexible wiring board according to claim 13, wherein (a) the epoxy resin additionally comprises: (a3) a flexible epoxy resin having a structure of three or more consecutive secondary carbons.

15. The flexible wiring board according to claim 13, wherein the mass ratio between (a1) the polyfunctional epoxy resin and (a2) the monofunctional epoxy resin is about 20:80 to 45:55.

16. The flexible wiring board according to claim 13, wherein both of the number average molecular weight of (a1) the polyfunctional epoxy resin and the number average molecular weight of (a2) the monofunctional epoxy resin are 2000 or less.

17. The flexible wiring board according to claim 13, wherein the number average molecular weight of (a1) the polyfunctional epoxy resin is 300 to 1500, and the number average molecular weight of (a2) the monofunctional epoxy resin is 100 to 300.

* * * * *